(No Model.)
A. THOMPSON.
APPARATUS FOR THE MANUFACTURE OF SHEET GLASS.
No. 385,735. Patented July 10, 1888.
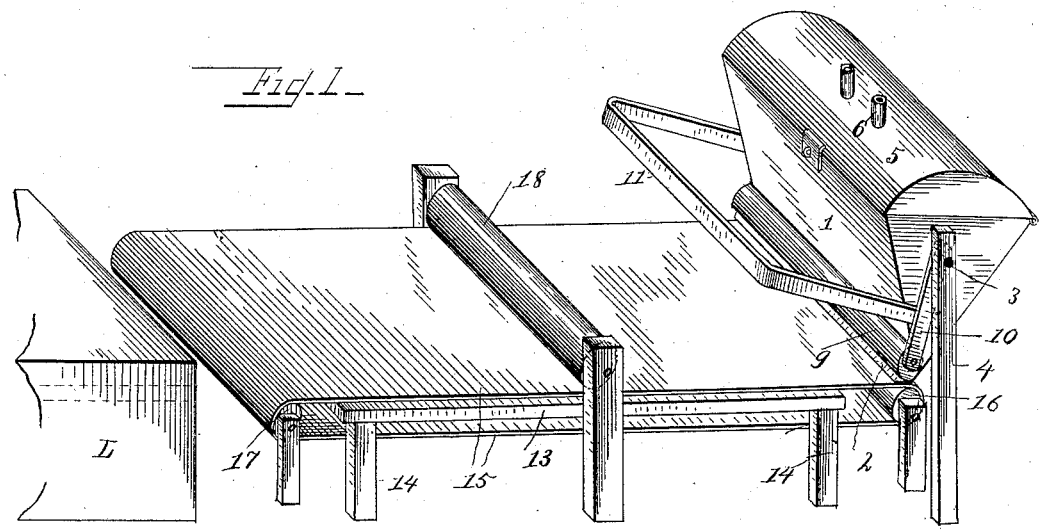
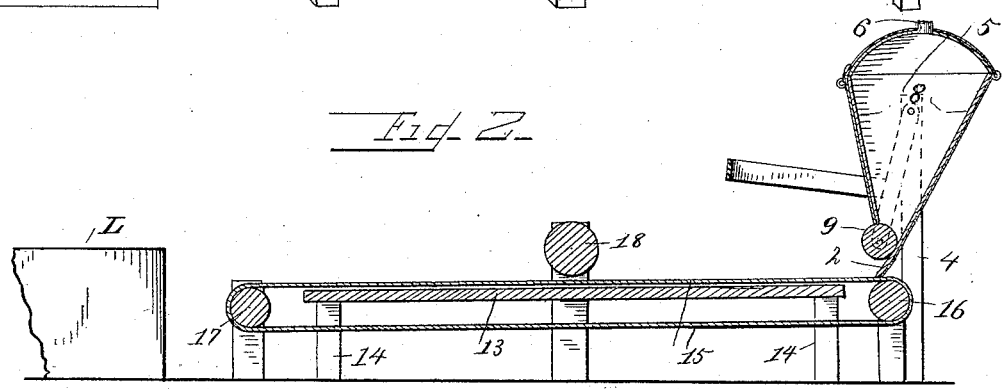
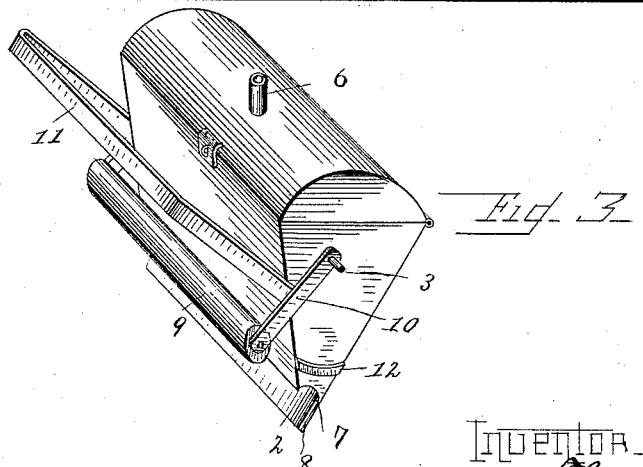
Witnesses:
G. A. Tauberschmidt
Edwin S. Clarkson
Inventor:
Andrew Thompson,
by F. W. Ritter Jr.
Atty.

UNITED STATES PATENT OFFICE.

ANDREW THOMPSON, OF PITTSBURG, PENNSYLVANIA, ASSIGNOR OF ONE-HALF TO JOSEPH L. MOORE, OF SAME PLACE.

APPARATUS FOR THE MANUFACTURE OF SHEET-GLASS.

SPECIFICATION forming part of Letters Patent No. 385,735, dated July 10, 1888.

Application filed February 11, 1888. Serial No. 263,726. (No model.)

*To all whom it may concern:*

Be it known that I, ANDREW THOMPSON, a citizen of the United States, residing at Pittsburg, in the county of Allegheny, State of Pennsylvania, have invented certain new and useful Improvements in Apparatus for the Manufacture of Sheet-Glass; and I do hereby declare the following to be a full, clear, and exact description of the same, reference being had to the accompanying drawings, in which—

Figure 1 is a perspective view of apparatus embodying my invention. Fig. 2 is a longitudinal sectional view of the same. Fig. 3 is a detached view of the holder for molten glass and its gage and forming roller.

Like figures refer to like parts wherever they occur.

My present invention relates to that class of apparatus for the manufacture of sheet-glass wherein the molten glass is delivered in sheet form either by its natural flow or under pressure, and preferably aeriform pressure, upon a cooling or chilling table, from which it passes to an annealing-leer, and has for its object to obtain a sheet of any desired thickness of uniform thickness throughout and of any desired length and width, as well as with a uniform fire-polished surface, which will for the majority of, if not for all, purposes preclude the necessity of the subsequent grinding and polishing now required by all sheet-glass not made by blowing.

To this end I employ a holder which contains the molten glass, and from which it is allowed to flow in sheet form, with a lining of soapstone, asbestus, fire-clay, or like material of a refractory or heat-resisting nature, which will retain a smooth and uniform surface and facilitate the flow of the molten glass, combining with said holder for the molten glass a free rotating or independent pressure and cut-off roller of refractory or heat-resisting material—such as soapstone, fire-clay, or asbestus—adapted to be moved by and with the flowing glass, and to both gage the thickness of the sheet and cause uniform distribution of the molten glass, so as to prevent the central thinning of the sheet, commonly occurring where ordinary slides or like gages are employed in forming sheets of glass by the flowing method. I support the said holder upon trunnions, journals, or equivalent means whereby the inclination of the holder can be varied to increase or decrease the rapidity of the flow, according as the sheet to be formed shall be thin and chill rapidly or thick and chill slowly; and I combine with the holder for receiving the molten glass and delivering it in sheet form a chilling-bed interposed between the holder and the leer, which chilling bed may be a simple inclined table of soapstone, asbestus, fire-clay, or like refractory material, which will preserve a smooth and uniform surface, or may be a traveling continuous belt or apron, or both combined—one for support and the other to facilitate the travel of the sheet of glass.

My invention consists in certain of said features of construction and in combinations thereof, all as will be hereinafter pointed out and claimed.

I will now proceed to describe my invention more specifically, so that others skilled in the art to which it appertains may apply the same.

In the drawings, 1 indicates a holder, of general triangular form in cross-section or hopper shape, and of such width from side to side as required for the sheet to be formed. The rear wall of said holder extends down, as at 2, to form a delivery lip or guide to insure the proper formation and delivery of the sheet. This holder is provided with trunnions or journals 3, by means of which it is movably supported in suitable uprights or supports, 4, to enable it to be set in a more or less vertical position, according to the character of discharge or feed required. If a thin sheet of glass is being formed, the glass will of course chill more rapidly, and the holders must be in, or more nearly in, a vertical position, while if a thick sheet of glass is being formed the glass will chill less rapidly, and the holder must accordingly be more or less inclined or tilted back to retard the feed. This construction also facilitates the filling of the holder, as it can be inclined to receive the molten glass, which may be tapped thereinto from tanks or like reservoirs wherein it has been melted.

The holder 1 is provided with a cover, 5, which may be hinged thereto so as to be turned back in filling the holder, or used to hermetically close the holder when it is desired to introduce aeriform or gaseous pressure for forcing out the sheet of glass.

6 indicates a tube, port, or orifice for introducing air or gas to produce pressure on the molten glass in the holder and force the same through the delivery-slot 7 at the bottom of the holder, or for introducing both air and gas when it is desired to burn the mixture in the holder for keeping the glass in a fluid condition. Two pipes, 6, may be used, if desired.

8 indicates the lining of the holder 1, which is of fire-clay, soapstone, or asbestus, the latter two being preferred, which lining extends down and covers the delivery lip or guide 2.

9 indicates a roller of soapstone, fire clay, or asbestus of length equal to the width of holder 1 and supported in front of the guide, and forming lip 2 at the level of the delivery-slot 7. This gage, forming, and cut-off (or valve) roller is suspended by means of pivoted arms 10, which may be pivoted directly on the holder 1, if desired, but are preferably hung on the journals 3 of said holder, as thereby a second set of pivots or journals is avoided.

11 indicates a lever by means of which the gage and forming roller is operated, and 12 a scale on the side of holder 1, or in equivalent position, by means of which the position of roller 9 can be set and regulated to obtain the desired outlet of holder 1 and the desired thickness of the sheet of glass. Beneath the holder 1, and between it and the leer L, is a chilling or cooling table for the reception of the sheet of glass on its delivery. This table may consist of an inclined slab (or slabs) of soapstone or fire-clay, 13, having suitable supports, 14, which table will receive the sheet and direct it to the leer; but in conjunction therewith I preferably employ an endless apron, 15, which may be made of wire-cloth overlaid with asbestus or like refractory material, said belt or apron carried by two or more suitable drums, 16 17, to which, if desired, any suitable motive power, gearing, &c., may be applied.

Directly over the inclined cooling-table or cooling-stone 13 (and over the asbestus apron 15, if the same is used) a second guide-roller, 18, (or more, if required,) may be placed, to preserve the sheet of glass in contact with the cooling-table, prevent any tendency to buckle, and guide it on its way to the leer.

L indicates the leer, which may be a car-leer, a fixed and movable bar-leer, or any of the several well-known forms of leers adapted for annealing sheet-glass.

The apparatus, being of substantially the character hereinbefore described, will operate as follows: The holder, being filled with molten glass from pots, crucibles, tanks, or other suitable source, is set at such an angle as will best suit the flow of molten glass to the sheet to be produced—more nearly the vertical plane for a thin sheet, which chills rapidly, and more nearly a horizontal plane for a thick sheet, which cools or chills slowly. If the right angle is selected, the sheet will be comparatively cool by the time it reaches the inclined cooling-table 13. The roller-gage 9 is then set to gage the size of delivery-slot 7, and the molten glass is allowed to flow, or is forced out by aeriform or gaseous pressure (natural gas may be used for the purpose) introduced through pipe 6, or in any other suitable way. As the sheet flows from slot 7, the gage-roller 9 will compress the edges of the plastic mass, keep said edges of uniform thickness, and prevent the sheet from thinning in the center. The sheet thus formed will fall on the inclined table 13 and slide toward the leer L, or upon the traveling asbestus apron 15, and be borne thereto. When a sheet of the desired length has been obtained, it may be separated by cracking it off or dividing it in any well-known way, or the gage-roller 9 may be forced back by lever 11, so as to temporarily close the delivery-slot 7 of the holder and arrest the flow of the molten glass.

The advantage incident to the refractory lining 8 is that a smooth uniform surface is obtained, which maintains the proper temperature, facilitates the flow of the molten glass, and does not scratch or crizzle the surface, as metal will. This feature is especially valuable on the guide-lip 2, which, being more exposed, is subject to greater changes of temperature.

The advantage incident to the form of the roller-gage 9 is the preventing the thickening of the edges and thinning of the center of the sheet being formed, while that incident to its material is the preservation of the smooth or fire-polished surface of the sheet and the avoidance of any crizzling of the glass; while the advantages of the soapstone, fire-clay, or asbestus refractory cooling-table and asbestus apron 15 are, that no sudden chilling of the sheet is liable to occur, so that the sheet of glass is delivered to the annealing-leer L in the best possible condition for annealing.

Having thus described the nature, operation, and advantages of my invention, what I claim, and desire to secure by Letters Patent, is—

1. In apparatus for the manufacture of sheet-glass by gravity or flowing method, a slotted holder having a guide-lip which projects downwardly below the holder and is provided with a lining or covering of refractory material, substantially as and for the purposes specified.

2. In apparatus for the manufacture of sheet-glass, a slotted holder having a lining of refractory material and provided with a guide-lip which projects downwardly beyond the holder, substantially as and for the purposes specified.

3. In apparatus for manufacturing sheet-glass, the combination, with a slotted holder, of a free rotating or independent roller-gage adapted to be moved by the flowing glass, substantially as and for the purposes specified.

4. In apparatus for the manufacture of sheet-glass, the combination, with a slotted holder having a guide-lip which projects below the slot, of a journaled or movable roller slot-valve and gage, substantially as and for the purposes specified.

5. In apparatus for the manufacture of sheet-glass, the combination, with a slotted holder provided with a downwardly-projecting guide-lip having a surface of refractory material, of a free rotating or independent roller gage and slot-valve of refractory material, substantially as and for the purposes specified.

6. In apparatus for the manufacture of sheet-glass, the journaled slotted glass-holder, substantially as and for the purposes specified.

7. In apparatus for the manufacture of sheet-glass, the combination, with a journaled slotted holder for the molten glass, of an inclined cooling-table of refractory material, substantially as and for the purposes specified.

In testimony whereof I affix my signature, in presence of two witnesses, this 2d day of February, 1888.

ANDREW THOMPSON.

Witnesses:
    JOHN T. MOORE,
    L. B. D. REESE.